Sept. 20, 1938.  F. W. KATELEY ET AL  2,130,686
HEATER AND VENTILATOR FOR VEHICLES
Filed July 9, 1936  2 Sheets-Sheet 1

INVENTORS
Francis W. Kateley
Edmund G. Mathauer
BY Donald U. Rich
ATTORNEY

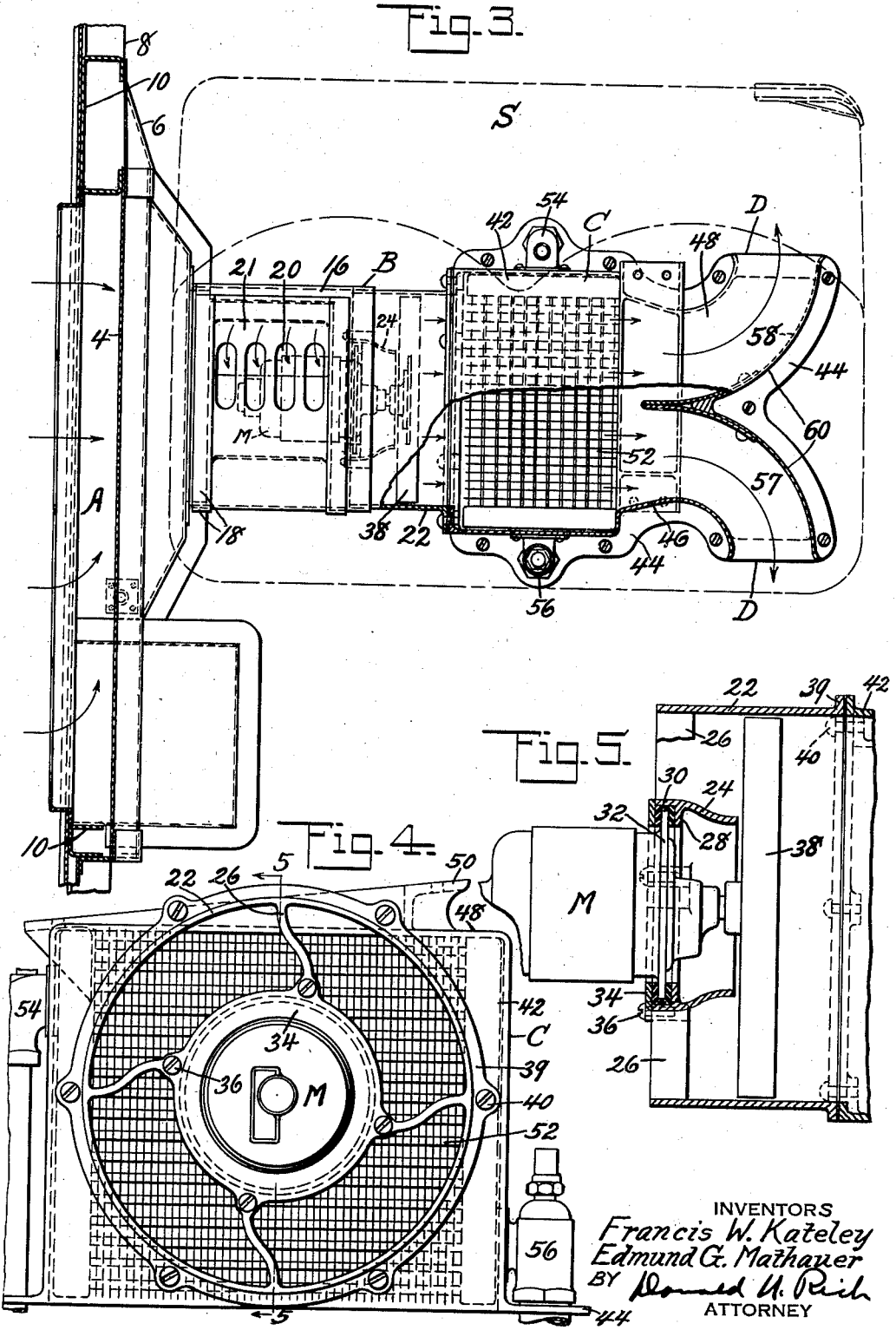

Patented Sept. 20, 1938

2,130,686

UNITED STATES PATENT OFFICE 2,130,686

HEATER AND VENTILATOR FOR VEHICLES

Francis W. Kateley and Edmund G. Mathauer, Upper Darby, Pa., assignors to American Car and Foundry Motors Company, New York, N. Y., a corporation of Delaware Application July 9, 1936, Serial No. 89,762

9 Claims. (Cl. 98—10)

This invention relates to heating and ventilating systems and has particular reference to such systems adapted for use in connection with road and rail vehicles.

The use of engine cooling water as a source of heat is well known in the art but such heaters have merely increased the temperature of the air already in the vehicle without any provision being made for the introduction of fresh air. Particularly during the cold seasons of the year the objectionable engine fumes seep into the vehicle and, combined with the heat and the limited air volume, such systems have been the cause of discomfort, sickness and sometimes accidents. In view of this, one object of the invention is to provide a heating system for a road and rail vehicle in which fresh warm air may be forced into the vehicle to maintain a pressure slightly above atmospheric and thus prevent the ingress of engine fumes.

Another object of this invention is the provision of a combined heating and ventilating system for use with road and rail vehicles which is so designed as to permit recirculation of air within the vehicle for heating.

Still another object of the invention is the provision of a heating and ventilating system for a vehicle which includes a hot water heater arranged out of the way of passengers and preferably under a seat intermediate the ends of the vehicle with means for directing heated air in opposite directions longitudinally of the vehicle.

A further object of the invention is the provision of a hot water heater unit so formed and arranged as to supply any desired proportion of fresh and recirculated warm air to the vehicle.

A still further object of the invention is the provision of a hot water heater unit for vehicles comprising a motor and blower assembly mounted therein on a single non-metallic support.

This invention also contemplates the provision of a new and useful ventilating system for road and rail vehicles.

These and other objects of the invention will be apparent to one skilled in the art from a study of the following description and the accompanying drawings, in which:

Fig. 3 is a plan view of the heater unit, the seat position being indicated by dot and dash line;

Fig. 4 is an end view of the heater unit and the blower housing with the fan removed, and Fig. 5 is a sectional view taken on line 5—5 of Fig. 4 and showing the motor and fan assembly mount.

Figure 1:
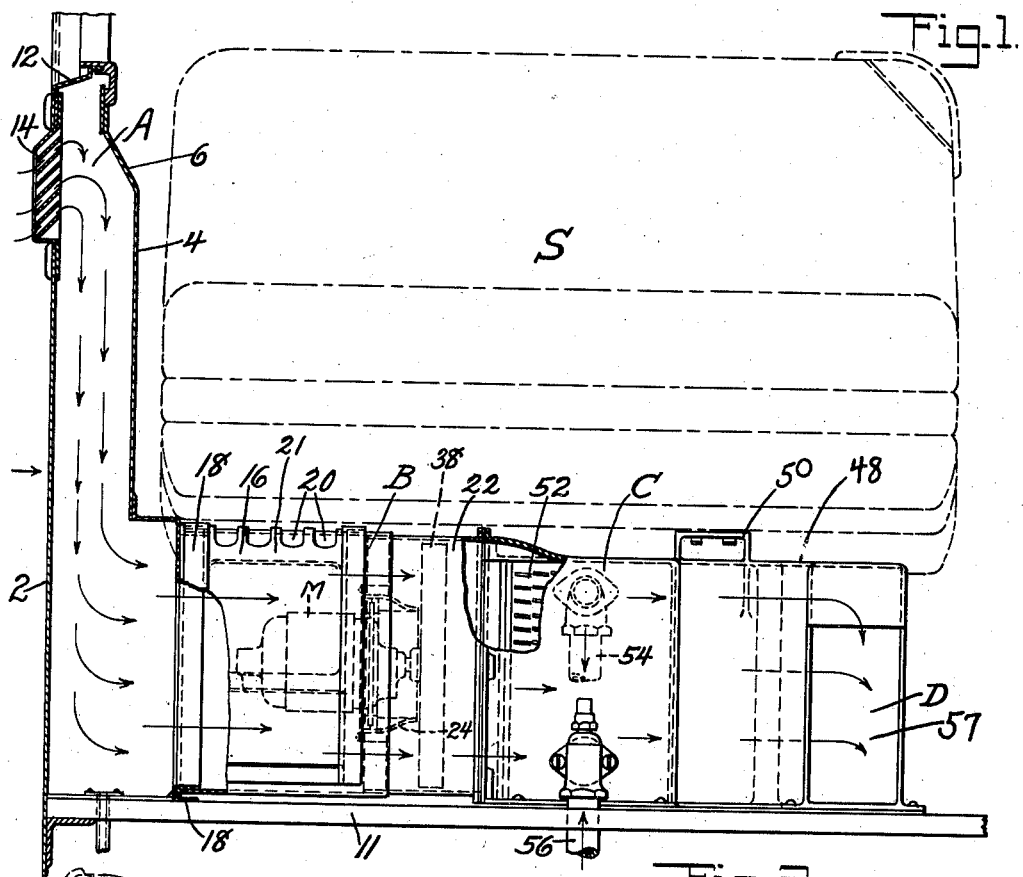
Figure 1 is a transverse sectional view of one-half of the vehicle and shows the unit's position beneath the seat.

Referring now more in detail to the drawings, the present invention includes generally a fresh air inlet comprising a duct A, a blower B, and a heater unit C provided with discharge nozzles D. As clearly shown in Fig. 1, the heater unit and blower housing are arranged beneath a seat S and, in the instance shown, are designed to form a support for said seat.

The duct A is formed by the vehicle side wall 2, an auxiliary lining 4 inwardly offset as at 6 from the usual lining 8, and is arranged between body posts 10 of the vehicle. The bottom closure of the duct A is formed by the vehicle floor 11, while the upper end of the duct is closed by the window sill 12. Arranged preferably immediately below the window sill 12 is a louvre unit 14 secured to the side wall in any suitable or desired manner and adapted to permit the ingress of fresh air to the duct A. It will be obvious that because the louvre unit 14 is arranged immediately adjacent the sill 12 it is at a point elevated a considerable distance from the road bed and thus prevents to a great degree the admission of engine fumes, dust or dirt particles. If desired a screen or filter may be used with the louvre unit 14 and further, shutters may be provided for regulating the amount of air admitted through the louvre unit but inasmuch as shutters for controlling or regulating louvres are well known in the art they are not shown in the drawings.

The blower B includes a housing 16 attached to the auxiliary lining 4 by means of a collar 18 and the upper portion thereof is provided with a plurality of air inlets 20 controlled by a shutter 21 rotatably mounted on the housing and adapted to regulate the extent of opening of said air inlets. The opposite end portion of the housing 16 is engaged with a motor support casting 22, substantially circular in cross section, and formed with a central bearing ring 24 (see Fig. 5) connected to the casting 22 by radiating arms 26. The bearing ring 24 is provided with an internal annular shoulder 28 serving as an abutment for a resilient annulus 30, channel-shaped in cross section, and constituting a resilient retainer for a lip or rim 32 formed on the motor M; this providing a substantially noiseless mounting for the motor. A retainer 34 is secured to the bearing ring 24 by fasteners 36 and engages the resilient annulus 30 to retain the latter in position. With the construction just described it is apparent that the motor M is supported at substantially a single zone without metal-to-metal contact. The motor shaft extends through the bearing ring 24 and carries at its end portion the fan or blower 38.

The motor support casting 22 is provided with an outturned flange 39 which provides an attaching means for the heater casting 42, the latter being provided with base flanges 44 by which it is attached to the vehicle floor 11.

Figure 2:
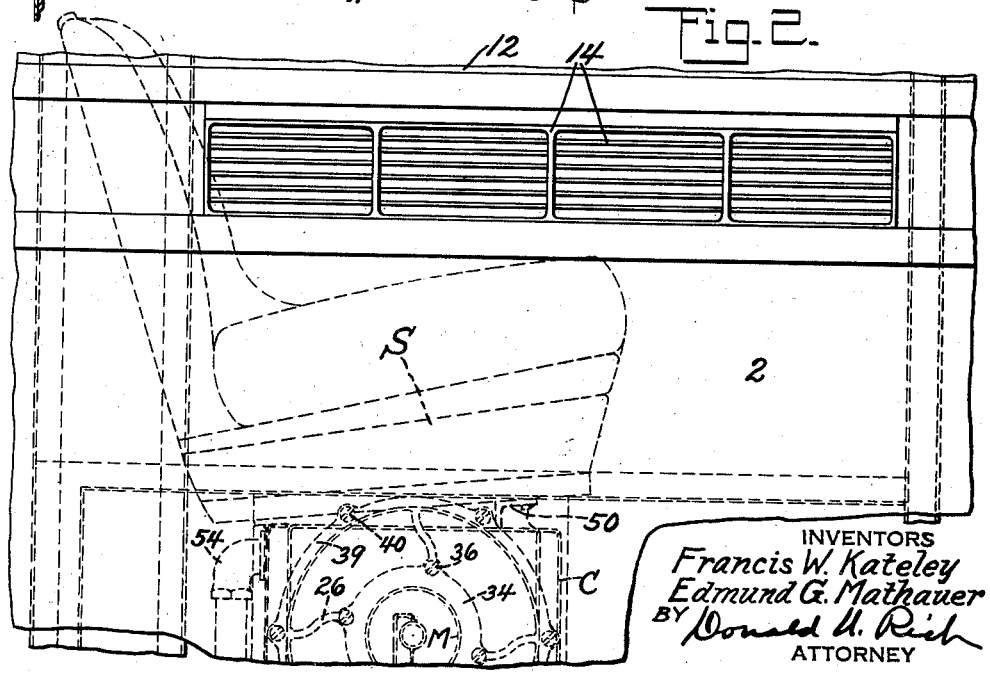
Fig. 2 is a side view of a portion of the vehicle showing the fresh air inlet and the unit's relation to the seat.

The heater casting 42 is provided with irregular side walls 46 and a top wall 48 upon which latter a bracket 50 is formed for supporting the seat S, as clearly shown in Figs. 1 and 2.

Arranged within the heater casting is a hot water radiator 52 coupled to a source of heat such as the cooling system of the engine by means of an inlet pipe 54 and an outlet pipe 56. The radiator is arranged in one end portion of the heater casting while the opposite or discharge end of the heater casting is formed with diverging nozzle-like discharge openings 57 and 58 respectively by means of a reversely curved end wall 60 (see Fig. 3). Because of the specific arrangement just described it will be apparent that any air flowing through the radiator in the direction of the arrows of Fig. 3 will be directed in opposite directions longitudinally of the vehicle.

In use, with the fan 38 in operation, it will be apparent that air from outside the vehicle will be drawn through the louvre unit 14 into the duct A, thence past the radiator where it will be heated and discharged against the end wall 60 of the heater casting. Due to the oppositely directed discharge nozzles 57 and 58 the fresh warm air will be directed towards the front and rear of the vehicle at the aisle area where it rises within the vehicle. In the event that the outside air is too cold for the unit to maintain the vehicle at a desired temperature, the amount of air admitted through the louvre unit may be decreased by operation of the louvre shutters hereinbefore referred to, whereupon the air within the vehicle may be recirculated through the unit for reheating. The openings 20 are provided with a shutter control in order that the amount of recirculated air may be regulated in accordance with desired requirements and indeed may be shut off completely if necessary. During the summer or warm periods of the year the supply of hot water may be cut off from the radiator by any suitable valve means well known in the art and the unit then will function solely as a ventilator but it is to be noted that at all times, with the fan 38 in operation, air will be forced into the vehicle to maintain a pressure therein slightly above atmospheric whereby to eliminate the possibility of objectionable or harmful odors or fumes entering the vehicle.

From the above description it is believed the construction and operation of the invention recited herein will be fully apparent to those skilled in the art but it is to be understood that the drawings illustrate only one embodiment of the invention and various changes in the form and proportions of the construction may be made within the scope of the appended claims without departing from the spirit of the invention.

What is claimed is:

1. A heater for vehicles having side walls and a floor comprising, a heating element situated adjacent the floor, air propelling means situated adjacent the floor and between the heating element and the vehicle side wall, a fresh air inlet duct situated adjacent the side wall and having communication with the exterior of the vehicle, and a casing connected to said inlet and housing said blower and heating element, said casing terminating in reversely curved outlets directed longitudinally of the vehicle.

2. A heater for vehicles having side walls and a floor comprising, a heating element situated adjacent the floor, air propelling means situated adjacent the floor and between the heating element and the vehicle side wall, a fresh air inlet duct formed in part by the vehicle side wall, and a casing connected to said inlet and housing said blower and heating element, said casing terminating in oppositely directed discharge outlets opening longitudinally of the vehicle.

3. A heater for vehicles having side walls and a floor comprising, a heating element situated adjacent the floor, air propelling means situated adjacent the floor and between the heating element and the vehicle side wall, a fresh air inlet duct situated adjacent the side wall and having communication with the exterior of the vehicle, a casing connected to said inlet and housing said blower and heating element, said casing having openings at the end adjacent the side wall for the admission of air for recirculation, and having oppositely directed openings at the end remote from the side wall located substantially at the center of the vehicle for the discharge of air longitudinally thereof.

4. A heater for vehicles having side walls and a floor with seats thereabove and comprising, a heating element situated beneath a seat, air propelling means situated beneath the seat and between the heating element and side wall, a fresh air inlet duct situated in the side wall adjacent one end of the seat, and a casing connected to said inlet and housing said blower and heating element, said casing terminating adjacent the other end of the seat in oppositely directed discharge outlets opening longitudinally of the vehicle.

5. A heater for vehicles having side walls and a floor with seats thereabove and comprising, a heating element situated beneath a sea, air propelling means situated beneath the seat and between the heating element and side wall, a fresh air inlet duct situated in the side wall adjacent one end of the seat, and a casing located wholly beneath the seat and connected to said inlet and housing said blower and heating element, said casing being provided at the end adjacent the side wall with openings for admission of air from the vehicle for recirculation and with oppositely directed openings for the discharge of air at the end remote from the side wall.

6. A combined heating and ventilating system for vehicles comprising a housing mounted on the floor of the vehicle and having a heating element therein and oppositely directed discharge nozzles located substantially adjacent the longitudinal center of the vehicle, a fresh air inlet duct formed in the side wall of the vehicle and provided with an air entrance means extending through the said side wall at a zone elevated above the floor and said housing, said duct and housing being connected, and air propelling means in the housing for drawing outside air through the duct and into contact with said heating element and for forcing the heated air into the vehicle substantially at its longitudinal center through the discharge nozzles in a direction substantially longitudinal of the vehicle.

7. A combined heating and ventilating unit for vehicles comprising a housing arranged transversely of the vehicle and on the floor thereof, said housing being provided at the end portion adjacent the longitudinal center of the vehicle with diverging oppositely directed discharge nozzles opening longitudinally of the vehicle, a heating element in said housing, a fresh air inlet duct framed into the side wall of the vehicle and provided with air entrance means extending through the said side wall at a zone elevated a substantial distance above said housing, and air propelling means in said housing for drawing outside air through the duct and for forcing said air out of said discharge nozzles longitudinally of the vehicle.

8. A combined heating and ventilating unit for vehicles comprising a housing arranged transversely of the vehicle and on the floor thereof, said housing terminating at the inner end portion in diverging oppositely directed discharge nozzles, a heating element in said housing, a fresh air inlet duct framed into the side wall of the vehicle and provided with air entrance means extending through the said side wall at a zone elevated a substantial distance above said housing, air entrance openings in said housing adapted to receive air from within the vehicle for recirculation, and air propelling means in said housing for drawing outside air through the duct and for forcing said air out of said discharge nozzles longitudinally of the vehicle.

9. A ventilating means for roofed vehicles comprising a housing arranged on the floor of the vehicle and provided with diverging oppositely directed discharge nozzles opening longitudinally of the vehicle adjacent the longitudinal center thereof, a fresh air inlet duct formed at least in part by the side wall of the vehicle and provided with an air entrance means extending through said side wall at a point between the roof and said housing, said duct being connected with said housing, and air propelling means in the housing for forcing outside air into the vehicle adjacent the longitudinal center thereof to build up a pressure above atmospheric therein.

FRANCIS W. KATELEY.
EDMUND G. MATHAUER.